Patented Apr. 27, 1943

2,317,804

UNITED STATES PATENT OFFICE 2,317,804

N-VINYL LACTAMS

Walter Reppe, Hans Krzikalla, Otto Dornheim, and Rudolf Sauerbier, Ludwigshafen-on-the-Rhine, Germany; vested in the Alien Property Custodian No Drawing. Application May 28, 1940, Serial No. 337,660. In Germany December 31, 1938

4 Claims. (Cl. 260—313)

The present invention relates to N-vinyl compounds and a process of producing same.

We have found that valuable N-vinyl compounds are obtained by causing acetylene, preferably at an elevated temperature, to act upon lactams or carboxylic or sulphonic acid imides or such carboxylic or sulphonic acid amides bearing one hydrogen atom attached to the nitrogen of the lactam-, imido- or amido group, in the presence of substances having a strongly basic action as catalysts. The said carboxylic or sulphonic acid imides or amides thus correspond to the general formula

in which either $R_1$ and $R_2$ are radicles of an aliphatic, aromatic, aliphatic-aromatic, hydroaromatic or heterocyclic carboxylic or sulphonic acid, or $R_1$ means one of the said radicles, whereas $R_2$ means another aliphatic, aromatic, aliphatic-aromatic, hydroaromatic or heterocyclic radicle, insensitive to strongly basic substances under the reaction conditions. As compounds of the said kind we may mention: Diacetamide, succinic imide, phthalimide, N-methylacetamide, N-acetylaniline, phenacetine, N-acetylaminodiphenyl, N-acetylaminodiphenylether, N.N'-diacetyldiaminobenzenes, N.N'-diacetylbenzidines, N-acetylaminonaphthalenes, N-acetylaminoanthraquinones, N-acetylaminodiphenylene oxides, N - acetylaminoquinolines, N - benzoyldodecylamine, N-benzoylaniline, N-benzene sulphonic acid alkylamides, N-benzene sulphonic acid arylamides and para-toluene sulphonic acid anilide.

Suitable lactams are for example α-pyrrolidone and its derivatives, such as α-methyl-α'-pyrrolidone, furthermore homologues of α-pyrrolidone, for example piperidone or caprolactam.

Among suitable catalysts we may mention, besides hydroxides or alcoholates of the alkali metals or alkaline earth metals, the N-alkali metal salts of the said lactames, imides or amides which may easily be obtained, for example, by causing an alkali metal to act upon the liquid or molten lactames, imides or amides, or causing a solution or suspension of the initial materials to react with alkali metal alcoholates. The catalysts may also be used in admixture with organic bases, for example pyridine or substances having an activating action, as for example zinc, cadmium, mercury, silver or copper salts.

The reaction with acetylene is preferably carried out in a pressure tight vessel. The acetylene is advantageously used under increased pressure in admixture with inert gases, such as nitrogen.

The reaction may be carried out in the absence of solvents, or diluents, especially when employing liquid or easily fusible initial materials. It may also be carried out in the presene of diluents, such as alcohols, for example butylalcohol, or hydrocarbons, for example toluene or decahydronaphthalene, or vinylethers, for example butyl vinyl ether. The process is preferably carried through at elevated temperatures, advantageously between 70 and 200° C. or more specifically, between 100 and 150° C. The process may be continuous or discontinuous.

The N-vinyl compounds obtained may be purified by distillation, if desired, under reduced pressure, by extraction with suitable solvents, such as benzene, or by recrystallization.

They are liquid for the greater part and possess a good dissolving power for highly polymerized substances for which they may therefore be used as solvents. They constitute valuable intermediates for dyestuffs, textile assistants and plastics.

The following examples serve to illustrate how the present invention may be carried out in practice, but the invention is not restricted to these examples. The parts are by weight, unless otherwise stated:

Example 1

26 parts of metallic potassium are dissolved in 1000 parts of α-pyrrolidone in a pressure tight vessel provided with a stirring device. A mixture of 1 part by volume of nitrogen and 2 parts by volume of acetylene is pressed into the vessel and the solution is then heated at 100–105° C. while stirring and kept at this temperature until 310 parts of acetylene have been taken up, i. e. for about 19 hours, acetylene being pressed in at the same time at the rate at which it is consumed. The content of the vessel is then subjected to a fractional distillation, the N-vinyl-α-pyrrolidone formed (B. P. 94 to 96° C. under 13 to 14 millimeters) being obtained in a very good yield.

Example 2

25 parts of ε-caprolactam (ε-aminocaproic acid lactam), 1.9 parts of the potassium salt of α-pyrrolidone and 50 parts of toluene are shaken in a pressure resistant vessel, under a pressure of 15 atmospheres, with a mixture of 2 parts by volume of acetylene and 1 part by volume of nitrogen at from 120 to 130° C. until the calculated amount of acetylene has been consumed, the pressure being maintained at about 15 atmospheres by pressing in further acetylene. The reaction mixture is then freed from toluene in vacuo and subjected to a fractional distillation. The fraction which distils over between 115 and 127° C. at 18 millimeters pressure (mercury gauge) contains the N-vinyl-ε-caprolactam which after a repeated fractionation is obtained as a colorless liquid boiling between 125 and 128° C. under a pressure of 21 millimeters (mercury gauge).

Example 3

50 parts of α-methyl-α'-pyrrolidone and 3.2 parts of the potassium salt of α-pyrrolidone are treated with a mixture of 2 parts by volume of acetylene and 1 part by volume of nitrogen at from 120 to 130° C. in the pressure tight vessel while shaking or agitating and pressing in further acetylene, until the calculated amount of acetylene has been taken up. The reaction product is subjected to a fractional distillation, the N-vinyl-α-methyl-α'-pyrrolidone being obtained as a colorless liquid boiling between 98° and 100° C. under a pressure of 13 millimeters (mercury gauge).

Example 4

2.5 parts of naphthostyrile (1-amino-8-naphthalene carboxylic acid lactam), 2 parts of the potassium salt of α-pyrrolidone and 50 parts of toluene, after pressing on 5 atmospheres of nitrogen and 10 atmospheres of acetylene, are heated in a shaking autoclave at from 140 to 145° C., further acetylene being continuously pressed in at the rate at which it is consumed. The reaction product is separated from unchanged naphthostyrile by filtration. After distilling off the solvent, the N-vinylnaphthostyrile formed is obtained by distillation and recrystallization from methanol in the form of yellowish green needles melting between 83° and 84° C. and boiling between 150° and 160° C. under a pressure of 1.5 millimeters (mercury gauge).

Example 5

50 parts of α-pyrrolidone and 2 parts of solid potassium hydroxide are shaken with a mixture of 2 parts by volume of acetylene and 1 part by volume of nitrogen in a pressure tight vessel at 120° C. until acetylene is no longer consumed. By subjecting the reaction mixture to distillation N-vinyl-α-pyrrolidone is obtained with a good yield.

Example 6

50 parts of α-pyrrolidone, 2.5 parts of the potassium salt of α-pyrrolidone and 2.4 parts by weight of pyridine are shaken with a mixture of 2 parts of acetylene and 1 part by weight of nitrogen at 110° C. in a pressure tight vessel until acetylene is no longer consumed. By subjecting the reaction product to distillation the N-vinyl-α-pyrrolidone is obtained wtih a good yield.

Example 7

50 parts of -α-pyrrolidone and 2 parts of the potassium salt of -α-pyrrolidone are filled in a pressure tight vessel. After pressing in acetylene up to a pressure of 6 atmospheres the mixture is shaken at 90° C., further acetylene being pressed in at the rate at which it is consumed. N-vinyl-α-pyrrolidone is obtained in a good yield.

Example 8

30 parts of α-pyrrolidone, 1.5 parts of the potassium salt of α-pyrrolidone and 0.5 part of cadmium acetate are treated with a mixture of 1 part by volume of nitrogen and 2 parts by volume of acetylene at 110° C. in a pressure tight vessel. Acetylene is pressed in at the rate at which it is consumed. N-vinyl-α-pyrrolidone is obtained in a very good yield.

Example 9

Into a stirring autoclave charged with 200 parts of N-acetylaniline and 10 parts of the sodium salt of acetylaniline prepared by reacting N-acetylaniline with sodium alcoholate and distilling off the alcohol, there is introduced a mixture of nitrogen and acetylene (ratio by volume 1:2) until the pressure amounts to about 15 atmospheres.

The autoclave is then heated to 140° to 150° C. Any decrease in pressure which ensues in the course of the reaction is made up for by intermittently adding pure acetylene. When the calculated amount of acetylene has been taken up, which is the case after about 20 hours, the mixture is allowed to cool. The N-vinyl acetylaniline which has been formed in a good yield is purified by fractional distillation at between 100 and 150° C. under a pressure of 1 millimeter (mercury gauge). Thus, colorless crystals melting at about 45° C. are obtained.

|  | C | H | N |
|---|---|---|---|
| Analysis: | | | |
| Found | 74.6 | 6.9 | 8.9 |
| Calculated | 74.6 | 6.8 | 8.7 |

The N-vinyl acetylaniline may easily be hydrogenated in usual manner to N-ethyl acetylaniline.

When using, instead of N-acetylaniline, 4-acetylaminophenol ethylether, 1-acetylaminonaphthalene or paratoluene sulphonic acid anilide the corresponding N-vinyl compounds are obtained which are also crystalline and colorless.

What we claim is:
1. N-vinyl compounds of lactames.
2. N-vinyl compounds of a member of the group consisting of α-pyrrolidone and its homologues.
3. N-vinyl-α-methyl α'-pyrrolidone.
4. N-vinyl-ε-caprolactam

WALTER REPPE.
HANS KRZIKALLA.
OTTO DORNHEIM.
RUDOLF SAUERBIER.